US012134083B2

(12) United States Patent
Fuhrmann et al.

(10) Patent No.: US 12,134,083 B2
(45) Date of Patent: Nov. 5, 2024

(54) COMPOSITIONS AND SYSTEMS FOR BINDING NUTRIENTS FROM MOVING BODIES OF WATER

(71) Applicant: SePRO Corporation, Carmel, IN (US)

(72) Inventors: Byran C. Fuhrmann, Whitakers, NC (US); West M. Bishop, Whitakers, NC (US); Gregory R. Armel, Whitakers, NC (US); Katrina M. Spinelli, Whitakers, NC (US)

(73) Assignee: SePRO Corporation, Carmel, IN (US)

( * ) Notice: Subject to any disclaimer, the term of this patent is extended or adjusted under 35 U.S.C. 154(b) by 182 days.

(21) Appl. No.: 17/690,850

(22) Filed: Mar. 9, 2022

(65) Prior Publication Data
US 2022/0289602 A1    Sep. 15, 2022

Related U.S. Application Data

(60) Provisional application No. 63/159,113, filed on Mar. 10, 2021.

(51) Int. Cl.
| | |
|---|---|
| *B01J 20/18* | (2006.01) |
| *B01J 20/22* | (2006.01) |
| *C02F 1/28* | (2023.01) |
| *C02F 1/58* | (2023.01) |
| *C02F 1/68* | (2023.01) |
| *C02F 3/32* | (2023.01) |
| *C02F 101/10* | (2006.01) |
| *C02F 101/16* | (2006.01) |
| *C02F 103/00* | (2006.01) |

(52) U.S. Cl.
CPC .............. *B01J 20/18* (2013.01); *B01J 20/22* (2013.01); *C02F 1/286* (2013.01); *C02F 1/288* (2013.01); *C02F 1/58* (2013.01); *C02F 1/683* (2013.01); *B01J 2220/46* (2013.01); *C02F 3/327* (2013.01); *C02F 2101/105* (2013.01); *C02F 2101/16* (2013.01); *C02F 2103/007* (2013.01); *C02F 2303/18* (2013.01)

(58) Field of Classification Search
None
See application file for complete search history.

(56) References Cited

FOREIGN PATENT DOCUMENTS

| | | | | |
|---|---|---|---|---|
| CN | 105567247 A | * | 5/2016 | |
| CN | 107281345 A | * | 10/2017 | ............. A61K 33/06 |
| CN | 110436552 A | * | 11/2019 | |
| CN | 110451656 A | * | 11/2019 | |
| WO | WO-2013046214 A2 | * | 4/2013 | ............. B01J 20/048 |
| WO | WO-2019014459 A1 | * | 1/2019 | ............. B01D 39/06 |

OTHER PUBLICATIONS

Purchas et al. Handbook of Filter Media (second edition), 2002, Chapter 10: Packed Beds). (Year: 2002).*
Mandal et al. (Water Conserv Sci Eng, 2019, 4, 149-161). (Year: 2019).*
Kim et al. (Nature Scientific Reports, 2020, 10, 5759). (Year: 2020).*
Kuriakose et al. (Water Qual. Res. J. Canada, 2004, 39, 258-266). (Year: 2004).*
Wang et al. (Bioresource Technology, 2015, 175, 391-395). (Year: 2015).*
Hanafiah et al. (IOP Conf. Series: Earth and Environmental Science, 2020, 596, 012048). (Year: 2020).*
Deng et al. (Int. J. Environ. Res. Public Health, 2018, 15, 357). (Year: 2018).*
Ivanets et al. (Int. J. Environ. Sci. Technol., 2016, 13, 2561-2568). (Year: 2016).*
Elmorsy et al. (Journal of Water Reuse and Desalination, 2019, 9,4, 339-349). (Year: 2019).*
Machine translation of CN-105567247-A, pp. 1-10. (Year: 2016).*
Machine translation of CN110436552A, pp. 1-7. (Year: 2019).*
Machine translation of CN-107281345-A, pp. 1-9. (Year: 2017).*
Machine translation of CN-110451656-A, pp. 1-5. (Year: 2019).*
Bunce, Joshua T. et al., A Review of Phosphorus Removal Technologies and Their Applicability to Small-Scale Domestic Wastewater Treatment Systems, Front. Environ. Sci. 6:8 (Feb. 2018).
Munn, Mark D. et al., Understanding the Influence of Nutrients on Stream Ecosystems in Agricultural Landscapes, Circular 1437, U.S. Department of the Interior, U.S. Geological Survey (2018).
Penn, Chad et al., A Review of Phosphorus Removal Structures: How to Assess and Compare Their Performance, Water, 9: 583 (Aug. 2017).

* cited by examiner

*Primary Examiner* — Clare M Perrin
(74) *Attorney, Agent, or Firm* — Koenig IP Works, PLLC; Katherine Koenig

(57) ABSTRACT

Some embodiments advantageously provide nutrient-binding compositions that include ingredients that have a synergistic effect such that the nutrient-binding composition is capable of removing more nutrients that the individual ingredients added together. In one embodiment, a nutrient-binding composition comprises: a first amount of a nutrient-binding ingredient; and a second amount of a biogenic additive, the first amount being greater than or equal to the second amount. In one aspect of the embodiment, the nutrient-binding composition has a greater nutrient removal capacity from a volume of water than an additive nutrient removal capacity of the first amount of nutrient-binding ingredient and the second amount of biogenic added together.

4 Claims, No Drawings

COMPOSITIONS AND SYSTEMS FOR BINDING NUTRIENTS FROM MOVING BODIES OF WATER

CROSS-REFERENCE TO RELATED APPLICATIONS

This application claims the benefit of U.S. Provisional Patent Application No. 63/159,113, filed Mar. 10, 2021, entitled COMPOSITIONS AND SYSTEMS FOR BINDING NUTRIENTS FROM MOVING BODIES OF WATER, which is incorporated by reference herein in its entirety.

FIELD

This disclosure relates to compositions for binding nutrients for surface waters, such as lakes and rivers. Such compositions generally including at least one nutrient-binding ingredient and at least one functional additive, such as a biogenic additive, that promotes sequestration of nutrients and/or water quality enhancement in aquatic environments.

BACKGROUND

Nitrogen and phosphorus are essential nutrients for growth of plants, algae, and bacteria. Too much of either, however, can severely disrupt an aquatic ecosystem. For example, nitrogen and/or phosphorus can enter an aquatic ecosystem from surrounding farmland, ranches, septic tanks, pollution, residential land, and other sources. As the amount of these nutrients in a body of water increases, so does growth of certain organisms such as aquatic plants, algae, and bacteria. High phosphorus levels can lead to harmful algal blooms (HABs), with many of these HAB species being capable of producing toxins that can be harmful to humans, pets, and wildlife. Rapid accumulation of aquatic plant or algal biomass can quickly cover the surface of water, not only making the body of water inaccessible or a poor habitat for birds, fish, and wildlife, but also critically depleting the dissolved oxygen content within the water. This, in turn, could make the water uninhabitable for fish and other aquatic fauna.

In natural moving bodies of water (such as streams, creeks, and rivers) and water subject to agricultural practices that promote drainage, the moving water spends less time in contact with sediments in the streambed and streambank, which reduces the opportunity for natural removal of nutrients by processes such as biological uptake, denitrification, and sorption to particle surfaces. Further, the nutrient load on downstream receiving waters is increased.

In stagnant bodies of water (such as lakes, ponds, and reservoirs), the sediment typically contains nutrient concentrations that are orders of magnitude greater than the water column. The sediments of stagnant bodies of water are also susceptible to anoxia or the depletion of dissolved oxygen, especially in lakes with high levels of nutrients. When surface sediments become anoxic, phosphorus can be released during the microbial reduction of iron oxides and ammoniacal nitrogen can released during the anaerobic breakdown of proteins contained in organic matter. The release of sediment nutrients during anaerobic conditions often leads to a positive feedback loop, where the anaerobic conditions lead to the release of nutrients, the nutrients lead to the growth of excessive algae, the excessive algae leads to the depletion of organic matter to the sediment, and the deposition of organic matter to the sediment leads to the deposition of dissolved oxygen and the continuation of anaerobic conditions.

Many systems for nutrient removal have been used, but each suffers from its own shortcomings and all are subject to efficacy issues based on variables such as water flow rate, water pH, nutrient concentrations, retention time, and others. For example, calcium- or magnesium-based phosphorus sorption materials (PSMs) generally require more retention time and a higher pH for effective phosphorus removal than iron- or aluminum-based PSMs. Iron-based PSMs generally exhibit higher cumulative phosphorus removal efficiency; however, iron-based PSMs may not work as efficiently when used for water having a higher (above neutral) pH or low dissolved oxygen and can release previously sorbed phosphorus if not allowed to drain between removal events. Further, determining the correct size, number, and/or hydraulic conductivity of a PSM can be complicated, and materials best suited for a particular body of water may be expensive, both for the materials themselves and transportation. Additionally, PSMs with smaller particle and/or pore size can increase retention time, but decrease hydraulic conductivity and cause backups in the flowing body of water. Other systems, such as enhanced biological phosphorus removal with activated sludge systems, have proven to be unreliable, and algae-based treatment is ill-suited for large-scale removal, especially at sites at higher latitudes.

When developing currently known nutrient-binding compositions, combinations are made of ingredients known to be effective in removing nutrients, such as phosphorus and/or nitrogen, from water. Given the costs of sourcing ingredients, evaluating candidate compositions, transporting such compositions to a treatment site, and the like, nutrient-binding ingredients and other additives are typically not evaluated that display neutral or negative nutrient removal (that is, that do not effectively remove nutrients or that contribute nutrients by leaching, release, decomposition, or other means) are typically not considered. For example, as plant material releases nutrients into aquatic environments, such materials would not be viable candidates for inclusion in a nutrient-binding composition. Likewise, heavy materials that are not likely to bind a significant amount of nutrients per weight would not be viable candidates because of, for example, increased transportation and application costs.

SUMMARY

Some embodiments advantageously provide nutrient-binding compositions that include ingredients that have a synergistic effect such that the nutrient-binding composition is capable of removing more nutrients that the individual ingredients added together. In one embodiment, a nutrient-binding composition comprises: a first amount of a nutrient-binding ingredient; and a second amount of a biogenic additive, the first amount being greater than or equal to the second amount.

In one aspect of the embodiment, the nutrient-binding composition has a greater nutrient removal capacity from a volume of water than an additive nutrient removal capacity of the first amount of nutrient-binding ingredient and the second amount of biogenic added together.

In one aspect of the embodiment, the nutrient-binding ingredient is at least one of activated aluminas, aluminosilicates, aluminum hydroxides, aluminum sulfate, aluminum-modified materials, calcium carbonates, calcium hydroxide, calcium oxide, calcium silicates, calcium sulfate, calcium-modified materials, cerium carbonate, cerium chloride, cerium hydroxide, cerium oxide, cerium oxalate, cerium sulfate, cerium-modified materials, concrete aggregate and similar materials, dolomite, magnesium carbonates, magnesium hydroxide, magnesium oxide, magnesium silicates, magnesium-modified materials, metallic iron, iron hydroxides, iron oxides, iron silicates, iron-modified materials, lanthanum carbonate, lanthanum chloride, lanthanum hydroxide, lanthanum oxide, lanthanum oxalate, lanthanum sulfate, lanthanum-modified materials, phyllosilicates, zirconium hydroxides, zirconium oxides, zirconium-modified materials, zeolites, activated carbon, layered double hydroxides, metal-modified zeolites, and heat treated nutrient binding ingredients. In one aspect of the embodiment, the nutrient-binding ingredient is activated alumina.

In one aspect of the embodiment, the biogenic additive is at least one of botanical materials, invertebrate exoskeleton materials, crustacean shell materials, bivalve shell materials, modified exoskeleton materials, calciferous products, and heat-treated biogenic materials. In one aspect of the embodiment, the biogenic additive is at least one of cellulose-based barks, foliage, conifer needles, conifer cones, stalks, mulch, husks, moss, hay, roots, root structures, leaves, flowers, petioles, stems, fronds, herbs, resins, woods, sticks, calcite, aragonite, marine limestone, diatomite, chitosan, bones, antlers, horns, hooves, biochar, and bone char.

In one aspect of the embodiment, the nutrient-binding ingredient is activated alumina; and the biogenic additive is diatomaceous earth.

In one aspect of the embodiment, the nutrient-binding ingredient is activated alumina; and the biogenic additive is a botanical material. In one aspect of the embodiment, the botanical material includes coconut fiber.

In one aspect of the embodiment, the nutrient-binding composition has a nutrient removal capacity that is at least two times greater than an additive nutrient removal capacity of the first amount of the nutrient-binding ingredient and the second amount of the biogenic additive added together.

In one aspect of the embodiment, the nutrient-binding ingredient is activated alumina; and the biogenic additive is bivalve shells.

In one aspect of the embodiment, the nutrient-binding ingredient is activated alumina; and the biogenic additive includes chitosan.

In one aspect of the embodiment, the nutrient-binding ingredient is crushed concrete; and the biogenic additive is aragonite.

In one aspect of the embodiment, the nutrient-binding ingredient is iron-enhanced activated alumina; and the biogenic additive is biochar.

In one aspect of the embodiment, the nutrient-binding ingredient is calcinated dolomite; and the biogenic additive is limestone.

In one aspect of the embodiment, the nutrient-binding ingredient includes zeolite.

In one aspect of the embodiment, the biogenic additive is at least one of a botanical material and a bivalve shell material.

In one aspect of the embodiment, the nutrient-binding ingredient further includes calcined dolomite and the biogenic additive is pine wood chips.

In one aspect of the embodiment, the nutrient-binding ingredient is aluminum sulfate; and the biogenic additive is bivalve shells.

In one embodiment, a nutrient-binding composition includes: a first amount of a nutrient-binding ingredient, the first amount being approximately 67% of a total composition of the nutrient-binding composition; and a second amount of a biogenic additive, the second amount being approximately 33% of the total composition of the nutrient-binding composition.

DETAILED DESCRIPTION

Before describing in detail exemplary embodiments, it is noted that the embodiments reside primarily in nutrient-binding compositions and systems, and such nutrient-binding compositions generally include at least one nutrient-binding ingredient and at least one functional additive, such as a biogenic additive, that promotes sequestration of nutrients and/or water quality enhancement in moving bodies of water and/or other aquatic environments. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In some embodiments, the present disclosure relates to compositions for binding and sequestering nutrients from aquatic environments, including stagnant surface waters and bodies of moving water (referred to herein as "nutrient-binding compositions" or "compositions for binding nutrients"). In some embodiments, such nutrient-binding compositions are formulated to be suitable for binding phosphorus (for example, for use as phosphorus sorption materials (PSMs)) and/or nitrogen (for example, for use as nitrogen sorption materials (NSMs)). In some non-limiting examples, nutrients are removed from water passing through the nutrient-binding composition by adsorption of dissolved nutrient(s), such as phosphate, ammonium, or nitrate, to surfaces of particles of the nutrient-binding ingredient. In some non-limiting examples, the removal of nutrients by the nutrient-binding composition is enhanced by the addition of one or more biogenic additives, which increase water flow through, or hydraulic conductivity of, the nutrient-binding composition while preserving or even enhancing nutrient binding efficiency. In some embodiments, the nutrient-binding composition is contained within a nutrient-binding device, which may be positioned relative to (for example, in contact with and/or at least partially submerged within) the body of water such that the water flows or passes through the nutrient-binding composition therein. In some embodiments, the nutrient-binding compositions described herein may be used to remove nutrients from slowly or weakly moving bodies of water, still or stagnant bodies of water, or the those other than rapidly moving bodies of water (for example, lakes, ponds, reservoirs, irrigation ponds, drainage and water removal canals, rivers, stormwater systems, wastewater discharges, best management practices, smaller creeks and streams, slow-moving rivers, tidal ponds, and the like). In some non-limiting examples, the removal of sediment nutrients by the nutrient-binding composition is enhanced by the addition of one or more biogenic additives, which enhances sorption of nutrients to the nutrient-binding composition and/or reduces the diffusion of nutrients from the sediment to the overlaying water column.

When developing currently known nutrient-binding compositions, combinations are made of ingredients known to be effective in removing nutrients, such as phosphorus (such as in the form of phosphate) and/or nitrogen (such as in the form of ammonium and/or nitrate), from water. Given the costs of sourcing ingredients, evaluating candidate compositions, transporting such compositions to a treatment site, and the like, nutrient-binding ingredients and other additives are typically not evaluated that display neutral or negative nutrient removal (that is, that do not effectively remove nutrients or that contribute nutrients by leaching, release, decomposition, or other means) are typically not considered. For example, as plant material releases nutrients into aquatic environments, such materials would not be viable candidates for inclusion in a nutrient-binding composition. Likewise, heavy materials that are not likely to bind a significant amount of nutrients per weight would not be viable candidates because of, for example, increased transportation and application costs.

In some embodiments, the nutrient-binding composition includes at least one nutrient-binding ingredients that bind, sequester, and/or otherwise inactivate nutrients such as nitrogen and/or phosphorus from the moving body of water or at the sediment-water interface in stagnant bodies of water. In some embodiments, the nutrient-binding composition includes a first amount of at least one nutrient-binding ingredient and a second amount of at least one biogenic additive, the first amount being greater than or equal to the second amount, with at least one nutrient-binding ingredient and the at least one biogenic additive having a synergistic effect on the amount of nutrients removed from a volume of water (for example, a body of moving water) by the nutrient-binding composition. These biogenic additives may be applied in blended mixtures with nutrient binders in a ratio of 1:1 to 99:1 (nutrient binder:biogenic additive). In one non-limiting example, the blended mixture has a ratio of between 75:25 and 99:1. In another non-limiting example, the blended mixture has a ratio of between 80:20 and 99:1. In another non-limiting example, the blended mixture has a ratio of between 85:15 and 97.5:2.5. In another non-limiting example, the blended mixture has a ratio of approximately 67:33. A nutrient-binding composition in accordance with the present disclosure removes a greater amount of nutrients (for example, phosphorus) from a volume of water, or has a greater nutrient removal capacity, than the combined nutrient removal capacity of all ingredients considered separately. In some embodiments, the at least one nutrient-binding ingredient adsorbs nitrogen and/or phosphorus and does not readily desorb nitrogen and/or phosphorus. Additionally, in some embodiments, the nutrient-binding ingredient(s) are porous materials having a surface area of at least 50 $m^2$/g. For example, suitable nutrient-binding ingredients, either alone or in combination, include activated alumina and iron-enhanced activated alumina, aluminosilicates such as feldspar, bentonite clay or attapulgite clay (e.g., Attasorb® attapulgite clay (BASF Corporation, Florham Park, N.J.), aluminum hydroxide, aluminum sulfate, aluminum-modified materials, calcium carbonate minerals, calcium hydroxide, calcium oxide, calcium silicates and calcium silicate hydrates such as wollastonite or heated treated opoka [e.g., Polonite™ (Ecofiltration Nordic AB, Solna, Sweden)], calcium sulfate, calcium-modified materials such as calcium alginate, cerium carbonate, cerium chloride, cerium hydroxide, cerium oxide, cerium oxalate, cerium sulfate, cerium-modified materials, concrete aggregate and similar materials (for example, crushed concrete), dolomite, magnesium carbonates, magnesium hydroxide, magnesium oxide, magnesium silicates, magnesium-modified materials, metallic iron, iron hydroxides such as goethite, iron oxides such as magnetite, iron silicates such as olivine, iron-modified materials as well as synthetic iron oxides or hydroxides (for example, those produced by thermal decomposition, precipitation, reduction, and/or calcination), lanthanum carbonate, lanthanum chloride, lanthanum hydroxide, lanthanum oxide, lanthanum oxalate, lanthanum sulfate, lanthanum-modified materials, phyllosilicates, zirconium hydroxides, zirconium oxides, zirconium-modified materials, zeolites, activated carbon, layered double hydroxides, metal-modified zeolites, and heat treated nutrient binding ingredients. Exemplary nutrient-binding ingredients and associated characteristics are shown below in Table 1:

TABLE 1

Exemplary nutrient-binding ingredients.

| Nutrient Binding Ingredient | Associated Characteristic(s) |
|---|---|
| Activated aluminas | Phosphorus inactivation |
| Aluminosilicates | Phosphorus inactivation |
| Aluminum hydroxide | Phosphorus inactivation |
| Aluminum sulfate | Phosphorus inactivation |
| Aluminum-modified materials | Phosphorus inactivation |
| Calcium carbonates | Phosphorus inactivation |
| Calcium hydroxide | Phosphorus inactivation |
| Calcium oxide | Phosphorus inactivation |
| Calcium silicates | Phosphorus inactivation |
| Calcium sulfate | Phosphorus inactivation |
| Cerium carbonate | Phosphorus inactivation |
| Cerium chloride | Phosphorus inactivation |
| Cerium hydroxide | Phosphorus inactivation |
| Calcium-modified materials | Phosphorus inactivation |
| Cerium oxide | Phosphorus inactivation |
| Cerium oxalate | Phosphorus inactivation |
| Cerium sulfate | Phosphorus inactivation |
| Cerium-modified materials | Phosphorus inactivation |
| Concrete aggregate | Phosphorus inactivation |
| Dolomite | Phosphorus inactivation |
| Magnesium carbonates | Phosphorus inactivation |
| Magnesium hydroxide | Phosphorus inactivation |
| Magnesium oxide | Phosphorus inactivation |
| Magnesium silicates | Phosphorus inactivation |
| Magnesium-modified materials | Phosphorus inactivation |
| Metallic iron | Phosphorus inactivation |
| Iron hydroxides | Phosphorus inactivation |
| Iron oxides | Phosphorus inactivation |
| Iron silicates | Phosphorus inactivation |
| Iron-modified materials | Phosphorus inactivation |
| Lanthanum carbonate | Phosphorus inactivation |
| Lanthanum chloride | Phosphorus inactivation |
| Lanthanum hydroxide | Phosphorus inactivation |
| Lanthanum oxide | Phosphorus inactivation |
| Lanthanum oxalate | Phosphorus inactivation |
| Lanthanum sulfate | Phosphorus inactivation |
| Lanthanum-modified materials | Phosphorus inactivation |
| Phyllosilicates | Phosphorus inactivation |
| Zirconium hydroxides | Phosphorus inactivation |
| Zirconium oxides | Phosphorus inactivation |
| Zirconium-modifed materials | Phosphorus inactivation |
| Zeolites | Nitrogen inactivation |
| Activated carbon | Phosphorus and Nitrogen inactivation |
| Layered double hydroxides | Phosphorus and Nitrogen inactivation |
| Metal-modified zeolites | Phosphorus and Nitrogen inactivation |
| Heat heated nutrient binding ingredients | Phosphorus and/or Nitrogen inactivation |

However, it will be understood that suitable nutrient-binding ingredients may include materials not discussed or shown in Table 1 above, and may also be capable of binding, sequestering, and/or otherwise inactivating nutrients and/or compounds from water or sediment other than or in addition to nitrogen and/or phosphorus.

In some embodiments, the nutrient-binding composition includes at least one biogenic additive as a functional additive that binds, sequesters, and/or otherwise inactivates nutrients such as nitrogen and/or phosphorus from the moving body of water, the sediment-water interface, and/or that otherwise enhance or facilitate the nutrient-binding efficacy of the nutrient-binding ingredient(s). For example, in some embodiments, the at least one biogenic additive does not bind nutrients itself, but acts synergistically with the nutrient-binding ingredient(s) to increase the expected nutrient binding effect of the nutrient-binding composition. In other embodiments, the at least one biogenic additive binds at least some nutrients from the moving body of water. Additionally, in some embodiments, the biogenic additive(s) have a particle size of between approximately 1 mm and 25 mm (±5 mm) and/or porosity of at least 0.25. In some embodiments, the biogenic additive(s) are not porous, but are used to increase the overall porosity (and, therefore, hydraulic conductivity) of the nutrient-binding composition. As used herein, the term "biogenic" refers to materials that are produced by, from, or of life forms. For example, suitable biogenic additives, either alone or in combination, include botanical materials (for example, dried plant materials) such as cellulose-based barks, foliage, conifer needles, conifer cones, stalks, mulch, husks, moss, hay, roots or root structures, leaves, fronds, flowers, petioles, stems, herbs, resins, woods, sticks, and the like; crustacean and/or bivalve shells such as calcite, aragonite, and marine limestone; invertebrate exoskeletons such as diatomite; modified exoskeletons such as chitosan; calciferous products such as bone, antlers, horns, hooves; and/or heat-treated biogenic materials such as biochar, bone char, and others. Exemplary biogenic additives are shown below in Table 2:

TABLE 2

Exemplary biogenic additives.
Biogenic Additives

Botanical materials such as cellulose-based barks, foliage, needles, stalks, mulch, husks, moss, hay, roots, or root structures, leaves, fronds, flowers, petioles, stems, herbs, resins, woods, and sticks.
Crustacean and/or bivalve shells such as calcite, aragonite, and marine limestone.
Invertebrate exoskeletons such as diatomite.
Chemically modified exoskeletons such as chitosan.
Calciferous products such as bones, antlers, horns, hooves.
Heat treated biogenic materials such as biochar and bone char.

The nutrient-binding compositions disclosed herein generally include a combination of a nutrient-binding ingredient with a biogenic additive, and display surprising (and, in some embodiments, synergistic) P-removal and/or N-removal efficacy despite the inclusion of, in some embodiments, biogenic additives that are not expected to contribute to P removal and/or N-removal.

However, it will be understood that suitable biogenic additives may include materials not discussed or shown in Table 2 above, and may also be capable of binding, sequestering, and/or otherwise inactivating nutrients and/or compounds from water other than or in addition to nitrogen and/or phosphorus and/or of acting synergistically to enhance the nutrient-binding capacity of one or more nutrient-binding ingredients in the nutrient-binding composition. It will also be understood that non-biogenic materials may be used, instead of or in addition to biogenic materials, that can mimic the design, size, and/or texture of biogenic materials (for example, fabrics, textiles, synthetic fibers, plastics, polymers, metals, modified metals, ceramics, composites, nanoparticle formulations, materials with amorphous crystal structures, and/or the like). Such non-biogenic materials may provide similar abilities to open pore size and synergistically improve the binding characteristics of nutrients such as phosphorus and/or nitrogen. In addition, such non-biogenic materials may be blended, adhered to, burned together with, and/or mechanically pulverized together with biogenic materials to produce similar results.

Non-limiting examples of nutrient-binding compositions are discussed below:

EXAMPLE 1

In a first non-limiting example, a nutrient-binding composition in accordance with the present disclosure includes a first amount of activated alumina (heat-treated aluminum oxide) as a nutrient-binding ingredient and a second amount of an invertebrate exoskeleton materials as a biogenic additive. In one embodiment, the nutrient-binding composition includes approximately 95% activated alumina (±3% g) and between approximately 1.6% (±1%) and approximately 7.7% (±1%) invertebrate exoskeleton materials. In one embodiment, the nutrient-binding composition includes approximately 95% activated alumina (±3%) and approximately 4.5% (±0.5%) diatomaceous earth.

In one experiment, a first amount of activated alumina (30 g) and five different second amounts of diatomaceous earth (0.5 g, 1.0 g, 1.5 g, 2.0 g, and 2.5 g) were each evaluated individually to determine the capability of each to remove phosphorus (P) from a volume of moving water (each being generally referred to as "medium" in this Example 1). In one experiment, each medium, contained within a mesh was placed within a first end of an 8-ft section of clear, flexible, PVC vinyl tubing. In this experiment, the mesh used was Carriff Erosion Sock® (Carriff Corporation, Inc. Midland, N.C.), a heavy duty mesh composed of circular-knit polyester having an apparent opening size (AOS) of 40 (0.400 mm), a puncture strength of 320 pound-force, a burst strength of 174 psi, water flow of 280 gal/min $ft^2$, and permittivity of 3.9 $s^{-1}$. However, it will be understood that other similar mesh materials may be used. In this experiment, a phosphorus solution was poured into a second end of the tubing using a funnel and collected in buckets from the first end of the tubing after the P solution had passed through the medium within the mesh. In this experiment, the P solution was prepared by combining a volume of ammonium phosphate $((NH_4)_3PO_4)$ and a volume of distilled water to produce a resulting P solution having an approximately 5 mg/L phosphorus concentration.

In this experiment, for each media evaluated, the P concentration of the collected P solution was evaluated using inductively coupled plasma—optical emission spectrometry (ICP-OES) and a calibration curve range from 0.01 mg/L to 25 mg/L. The amount of actual P removal (mg/min) by each medium measured by this experiment are shown below in Table 3:

TABLE 3

Actual P removal observed in various media.

| Medium | Removal (mg/min) |
| --- | --- |
| Activated alumina (30 g) | 0.589 |
| Diatomaceous earth (0.5 g) | 0.0429 |
| Diatomaceous earth (1.0 g) | 0.0857 |
| Diatomaceous earth (1.5 g) | 0.110 |
| Diatomaceous earth (2.0 g) | 0.155 |
| Diatomaceous earth (2.5 g) | 0.114 |

Next, five compositions were made to evaluate P removal by various combinations of activated alumina and diatomaceous earth: a first composition including 30 g activated alumina and 0.5 g diatomaceous earth (representing a nutrient-binding composition being 98.4% activated alumina and 1.6% diatomaceous earth); a second composition including 30 g activated alumina and 1.0 g diatomaceous earth (representing a nutrient-binding composition being 96.8% activated alumina and 3.2% diatomaceous earth); a third composition including 30 g activated alumina and 1.5 g diatomaceous earth (representing a nutrient-binding composition being 95.2% activated alumina and 4.8% diatomaceous earth); a fourth composition including 30 g activated alumina and 2.0 g diatomaceous earth (representing a nutrient-binding composition being 93.7% activated alumina and 6.3% diatomaceous earth); and a fifth composition including 30 g activated alumina and 2.5 g diatomaceous earth (representing a nutrient-binding composition being 92.3% activated alumina and 7.7% diatomaceous earth).

Based on the actual P removal displayed by each medium, it is expected that a combination of activated alumina and some amount of diatomaceous earth would show an additive amount of P removal from the P solution. For example, it is expected that a nutrient-binding composition including 30 g activated alumina and 1.0 g diatomaceous earth would remove approximately 0.675 mg/min phosphorus.

However, it was surprisingly found that, when subject to the same evaluation as the individual media, all except one combination of this activated alumina and diatomaceous earth produced an antagonistic effect (less actual P removal than expected), with a combination of activated alumina and diatomaceous earth (1.5 g) producing a synergistic effect (more actual P removal than expected). Specifically, a nutrient-binding composition including 30 g activated alumina and 0.5 g (or 1.6% of the total composition) diatomaceous earth actually removed approximately 63.1% less P than the additive amount expected (0.233 mg/min actual versus 0.632 mg/min expected); a nutrient-binding composition including 30 g activated alumina and 1.0 g (or 3.2% of the total composition) diatomaceous earth actually removed approximately 16.4% less P than the additive amount expected (0.564 mg/min actual versus 0.675 mg/min expected); a nutrient binding composition including 30 g activated alumina and 2.0 g (or 6.3% of the total composition) diatomaceous earth actually removed approximately 46.1% less P than the additive amount expected (0.401 mg/min actual versus 0.744 mg/min expected); and a nutrient-binding composition including 30 g activated alumina and 2.5 g (or 7.7% of the total composition) diatomaceous earth actually removed approximately 52.6% less P than the additive amount expected (0.333 mg/min actual versus 0.703 mg/min expected). In contrast, a nutrient-binding composition including 30 g activated alumina and 1.5 g (or 4.8% of the total composition) diatomaceous earth actually removed approximately 33.9% more P than the additive amount expected (0.936 mg/min actual versus 0.699 mg/min expected). Therefore, one embodiment of a nutrient-binding composition in accordance with the present disclosure includes activated alumina and diatomaceous earth, the diatomaceous earth being present in an amount that is approximately 4.8% (±1%) of the total composition. In one embodiment, the nutrient-binding composition includes 95.2% activated alumina and 4.8% diatomaceous earth. These surprising results are shown in Table 4 below:

TABLE 4

Actual P removal compared with expected P removal for five compositions, each having 30 g activated alumina, with 0.5-2.5 g diatomaceous earth.

| Diatomaceous Earth Content | Actual P Removal (mg/min) | Expected P Removal (mg/min) | Observed Effect |
|---|---|---|---|
| 1.6% (0.5 g) | 0.233 | 0.632 | Antagonistic |
| 3.2% (1.0 g) | 0.564 | 0.675 | Antagonistic |
| 4.8% (1.5 g) | 0.936 | 0.699 | Synergistic |
| 6.3% (2.0 g) | 0.401 | 0.744 | Antagonistic |
| 7.7% (2.5 g) | 0.333 | 0.703 | Antagonistic |

It will be understood that other nutrient-binding ingredients may be used instead of or in addition to activated alumina. Likewise, it will be understood that other planktonic exoskeleton materials may be used instead of or in addition to the diatomaceous earth discussed in this non-limiting example.

EXAMPLE 2

In a second non-limiting example, a nutrient-binding composition in accordance with the present disclosure includes a first amount of activated alumina (heat-treated aluminum oxide) as a nutrient-binding ingredient and a second amount of botanical materials as a biogenic additive. In one embodiment, the nutrient-binding composition includes approximately 97% (±3%) activated alumina and approximately 3% (±1%) dried plant materials, such as coconut fiber.

In one experiment, activated alumina and coconut fiber (each being generally referred to as "medium" in this Example 2) were each evaluated individually to determine the capability of each to remove P from a volume of moving water, using an experimental setup and evaluation techniques substantially similar to those discussed in Example 1. As is shown below in Table 5, 30 g of activated alumina removed 1.27 mg/min from the P solution. As is also shown below in Table 5, 30 g of coconut fiber not only did not remove any P, but also added 0.0857 mg/min P to the P solution. As plant material, it is expected that coconut fiber releases nutrients, including P, over time when exposed to a liquid such as water.

Next, a composition was made to evaluate P removal by a combination of activated alumina and coconut fiber, wherein 97% of the composition is activated alumina and 3% of the composition is coconut fiber.

Based on the actual P removal displayed by each medium, it is expected that a nutrient-binding composition having activated alumina and coconut fiber would remove less P from the P solution than the activated alumina alone, due to the contribution of P to the P solution by the coconut fiber. For example, in a nutrient-binding composition including activated alumina and coconut fiber, it is expected that the nutrient-binding composition will display P removal that is less than the P removal of the activated alumina, because coconut fiber not only does not contribute to P removal, but also adds P into the P solution. As a specific example, as shown below in Table 5, a nutrient-binding composition being 97% activated alumina and 3% coconut fiber would be expected to remove 1.22 mg/min P.

However, it was surprisingly found that, when subject to the same evaluation as the individual media, a combination of this activated alumina and a small amount of coconut fiber produces a synergistic effect and removes more P from the P solution than the activated alumina alone. Specifically, a nutrient-binding composition including 97% activated alumina and 3% coconut fiber actually removed more than double the P than (approximately 135% more P than, or approximately 235% of) the additive amount expected (1.22 mg/min). Therefore, one embodiment of a nutrient-binding composition in accordance with the present disclosure includes approximately 97% (±3%) activated alumina and approximately 3% (±1%) coconut fiber. This surprising result is shown in Table 5 below:

TABLE 5

Actual P removal compared with expected P removal for individual media and one nutrient-binding composition.

| Medium | Actual P Removal (mg/min) | Expected P Removal (mg/min) | Observed Effect |
|---|---|---|---|
| Activated alumina (30 g) | 1.27 | N/A | N/A |
| Coconut fiber (30 g) | −0.0857 | N/A | N/A |
| Activated alumina (29 g) and coconut fiber (1 g) | 2.87 | 1.22 | Synergistic |

It will be understood that other nutrient-binding ingredients may be used instead of or in addition to activated alumina. Likewise, it will be understood that the use of other plant materials instead of or in addition to the coconut fiber used in this non-limiting example is contemplated.

EXAMPLE 3

In a third non-limiting example, a nutrient-binding composition in accordance with the present disclosure includes a first amount of activated alumina (heat-treated aluminum oxide) as a nutrient-binding ingredient and a second amount crustacean or bivalve shells as a biogenic additive. In one embodiment, the nutrient-binding composition includes approximately 90% activated alumina (±4%) and between approximately 6% (±2%) and approximately 14% (±2%) crustacean or bivalve shells, such as pelletized oyster shells (1-15 mm particle size). In one embodiment, the oyster shells are pelletized oyster shells obtained from Manna Pro Products LLC. In one embodiment, the nutrient-binding composition includes 93.7% activated alumina and 6.3% oyster shells; in one embodiment, the nutrient-binding composition includes 89.6% activated alumina and 10.4% oyster shells; in one embodiment, the nutrient-binding composition includes 85.7% activated alumina and 14.3% oyster shells.

The activated alumina and the oyster shells (2.0 g, 3.5 g, 5.0 g) were each evaluated individually to determine the capability of each to remove P from a volume of moving water (each being generally referred to as "medium" in this Example 3), using an experimental setup and evaluation techniques substantially similar to those discussed in Example 1. As is shown in Table 6 below, 30 g activated alumina removed 0.589 mg/min P from the P solution and 30 g oyster shells (chitosan) removed 0.323 mg/min P from the P solution:

TABLE 6

Actual P removal by individual media (activated alumina and oyster shells).

| Medium | Actual P Removal (mg/min) |
|---|---|
| Activated alumina (30 g) | 0.589 |
| Oyster shells (30 g) | 0.323 |

Next, three compositions were made to evaluate P removal by a combination of activated alumina and oyster shells: a first composition including 30 g activated alumina and 2.0 g oyster shells (representing a nutrient-binding composition being 93.7% activated alumina and 6.3% oyster shells); a second composition including 30 g activated alumina and 3.5 g oyster shells (representing a nutrient-binding composition being 89.6% activated alumina and 10.4% oyster shells); and a third composition including 30 g activated alumina and 5.0 g oyster shells (representing a nutrient-binding composition being 85.7% activated alumina and 14.3% oyster shells).

Based on the actual P removal displayed by each medium, it is expected that a combination of activated alumina and some amount of oyster shells would show an additive amount of P removal from the P solution. For example, it is expected that a nutrient-binding composition having activated alumina (30 g) and oyster shells (2.0 g) would remove approximately 0.611 mg/min phosphorus (that is, 0.589 mg/min P removal by the activated alumina and 0.022 mg/min P removal by the oyster shells (2.0 g, which is one-fifteenth of the 30 g of oyster shells evaluated alone)).

However, it was surprisingly found that, when subject to the same evaluation as the individual media, all combinations of this activated alumina and oyster shells produced a synergistic effect (more actual P removal than expected). Specifically, a nutrient-binding composition including 30 g of this activated alumina and 2.0 g (or 6.3% of the total composition) oyster shells actually removed approximately 43.2% more P than the additive amount expected (0.875 mg/min actual versus 0.611 mg/min expected); a nutrient-binding composition including 30 g of this activated alumina and 3.5 g (or 10.4% of the total composition) oyster shells actually removed approximately 20% more P than the additive amount expected (0.752 mg/min actual versus 0.627 mg/min expected); and a nutrient binding composition including 30 g of this activated alumina and 5.0 g (or 14.3% of the total composition) oyster shells actually removed approximately 47.9% more P than the additive amount expected (0.951 mg/min actual versus 0.643 mg/min expected). Therefore, one embodiment of a nutrient-binding composition in accordance with the present disclosure includes activated alumina and oyster shells, the oyster shells being present in an amount that is approximately 6.3% (±1%) of the total composition; one embodiment of a nutrient-binding composition in accordance with the present disclosure includes activated alumina and oyster shells, the oyster shells being present in an amount that is approximately 10.4% (±2%) of the total composition; and one embodiment of a nutrient-binding composition in accordance with the present disclosure includes activated alumina and oyster shells, the oyster shells being present in an amount that is approximately 14.3% (±2%) of the total composition. For example, in one embodiment, a nutrient-binding composition includes 93.7% activated alumina and 6.3% oyster shells; in one embodiment, a nutrient-binding composition includes 89.6% activated alumina and 10.4% oyster shells; in one embodiment, a nutrient-binding composition includes 85.7% activated alumina and 14.3% oyster shells. These surprising results are shown in Table 7 below:

TABLE 7

Actual P removal compared with expected P removal by three compositions, each having 30 g activated alumina, with 2.0-5.0 g oyster shells.

| Oyster Shell Content | Actual P Removal (mg/min) | Expected P Removal (mg/min) | Observed Effect |
|---|---|---|---|
| 6.3% (2.0 g) | 0.875 | 0.611 | Synergistic |
| 10.4% (3.5 g) | 0.752 | 0.627 | Synergistic |
| 14.3% (5.0 g) | 0.951 | 0.643 | Synergistic |

It will be understood that other nutrient-binding ingredients may be used instead of or in addition to activated alumina. Likewise, it will be understood that other crustacean or bivalve shells may be used instead of or in addition to the oyster shells discussed in this non-limiting example.

EXAMPLE 4

In a fourth non-limiting example, a nutrient-binding composition in accordance with the present disclosure includes a first amount of activated alumina (heat-treated aluminum oxide) as a nutrient-binding ingredient and a second amount of planktonic or invertebrate exoskeleton materials as a biogenic additive. In one embodiment, the nutrient-binding composition includes approximately 94% (±3%) activated alumina and approximately 6% (±1%) modified exoskeleton materials, such as chitosan. In one embodiment, the modified exoskeleton materials are chitosan flakes obtained from Tidal Vision Products Inc.

In one experiment, the activated alumina and the chitosan (each being generally referred to as "medium" in this Example 4) were each evaluated individually to determine the capability of each to remove P from a volume of moving water, using an experimental setup and evaluation techniques substantially similar to those discussed in Example 1. As is shown in Table 8 below, 30 g of activated alumina removed 0.589 mg/min and 30 g of chitosan removed no (0.0 mg/min) P from the P solution:

TABLE 8

Actual P removal by individual media (activated alumina and chitosan).

| Medium | Actual P Removal (mg/min) |
|---|---|
| Activated alumina (30 g) | 0.589 |
| Chitosan (30 g) | 0.00 |

Next, a composition was made to evaluate P removal by a combination of activated alumina and chitosan: 30 g activated alumina and 2.0 g chitosan (representing a nutrient-binding composition being 93.7% activated alumina and 6.3% chitosan).

Based on the actual P removal displayed by each medium, it is expected that a nutrient-binding composition having activated alumina and chitosan would remove the same amount of P from the P solution than 30 g of activated alumina alone, as chitosan alone did not display any P removal. For example, a nutrient-binding solution including 30 g activated alumina and a small amount of chitosan (without additional nutrient-biding ingredients) is expected to removal 0.589 mg/min P, the same as the activated alumina alone.

However, it was surprisingly found that, when subject to the same evaluation as the individual media, a combination of this activated alumina and a small amount of chitosan produces a synergistic effect and removes more P from the P solution than the activated alumina alone. Specifically, a nutrient-binding composition including 30 g activated alumina and 2.0 g chitosan actually removed more than three times the P than (approximately 224% more P than, or approximately 324% of) the additive amount expected (0.589 mg/min). Therefore, one embodiment of a nutrient-binding composition in accordance with the present disclosure includes approximately 94% (±3%) activated alumina and approximately 6% (±1%) chitosan. In one embodiment, the nutrient-binding composition includes 93.7% activated alumina and 6.3% chitosan. This surprising result is shown in Table 9 below:

TABLE 9

Actual P removal compared with expected P removal by a composition including chitosan and activated alumina.

| Chitosan Content | Actual P Removal (mg/min) | Expected P Removal (mg/min) | Observed Effect |
|---|---|---|---|
| 6.3% (2.0 g) | 1.91 | 0.589 | Synergistic |

EXAMPLE 5

In a fifth non-limiting example, a nutrient-binding composition in accordance with the present disclosure includes a first amount of crushed concrete aggregate as a nutrient-binding ingredient and a second amount of planktonic or invertebrate exoskeleton materials as a biogenic additive. In one embodiment, the nutrient-binding composition includes approximately 66.7% (±3%) crushed concrete and approximately 33.3% (±2%) crustacean or bivalve shells. In one embodiment, the planktonic or invertebrate exoskeleton materials are aragonite obtained from Seven Springs Farm Supply.

In one experiment, the crushed concrete aggregate, and the aragonite (each being generally referred to as "medium" in this Example 5) were each evaluated individually to determine the capability of each to remove P from a volume of moving water, using an experimental setup and evaluation techniques substantially similar to those discussed in Example 1. As is shown in Table 10 below, 30 g of crushed concrete removed 0.489 mg/min and 30 g of aragonite contributed 0.064 mg/min (−0.064 mg/min) P to the P solution:

TABLE 10

Actual P removed by individual media (crushed concrete and aragonite).

| Medium | Actual P Removal (mg/min) |
|---|---|
| Crushed concrete (30 g) | 0.489 |
| Aragonite (30 g) | −0.064 |

Next, a composition was made to evaluate P removal by a combination of crushed concrete and aragonite: 20 g crushed concrete and 10 g aragonite (representing a nutrient-binding composition being 66.7% crushed concrete and 33.3% aragonite).

Based on the actual P removal displayed by each medium, it is expected that a nutrient-binding composition having crushed concrete and aragonite would show an additive amount of P removal from the P solution. For example, it is expected that a nutrient-binding composition having crushed concrete (20 g) and aragonite (10 g) would remove approximately 0.305 mg/min phosphorus (that is, 0.326 mg/min P removal by the crushed concrete and 0.021 mg/min P addition by the aragonite). However, it was surprisingly found that, when subject to the same evaluation as the individual media, a combination of this crushed concrete and aragonite produces a synergistic effect and removes more P from the P solution than the crushed concrete alone. Specifically, a nutrient-binding composition including 20 g crushed concrete and 10 g aragonite actually removed more than two times the P than (approximately 117% more P than, or approximately 217% of) the additive amount expected (0.305 mg/min). Therefore, one embodiment of a nutrient-binding composition in accordance with the present disclosure includes approximately 66.7% (±3%) crushed concrete and approximately 33.3% (±2%) aragonite. In one embodiment, the nutrient-binding composition includes 66.7% crushed concrete and approximately 33.3% aragonite. This surprising result is shown in Table 11 below:

TABLE 11

Actual P removal compared with expected P removal by a composition including crushed concrete and aragonite.

| Aragonite Content | Actual P Removal (mg/min) | Expected P Removal (mg/min) | Observed Effect |
|---|---|---|---|
| 33.3% (10 g) | 0.661 | 0.305 | Synergistic |

EXAMPLE 6

In a sixth non-limiting example, a nutrient-binding composition in accordance with the present disclosure includes a first amount of iron-enhanced activated alumina as a nutrient-binding ingredient and a second amount of heat-treated biogenic material as a biogenic additive. In one embodiment, the nutrient-binding composition includes approximately 66.7% (±3%) iron-enhanced activated alumina and approximately 33.3% (±2%) heat treated biogenic material. In one embodiment, the heat-treated biogenic material is biochar, obtained from Plantonix.

In one experiment, the iron-enhanced activated alumina, and the biochar (each being generally referred to as "medium" in this Example 6) were each evaluated individually to determine the capability of each to remove P from a volume of moving water, using an experimental setup and evaluation techniques substantially similar to those discussed in Example 1. As is shown in Table 12 below, 30 g of iron-enhanced activated alumina removed 0.926 mg/min and 30 g of biochar contributed 0.066 mg/min (−0.066 mg/min) P to the P solution:

TABLE 12

Actual P removal by individual media (iron-enhanced activated alumina and biochar).

| Medium | Actual P Removal (mg/min) |
|---|---|
| Iron-enhanced activated alumina (30 g) | 0.926 |
| Biochar (30 g) | −0.066 |

Next, a composition was made to evaluate P removal by a combination of iron-enhanced activated alumina and biochar: 20 g iron-enhanced activated alumina and 10 g biochar (representing a nutrient-binding composition being 66.7% iron-enhanced activated alumina and 33.3% biochar).

Based on the actual P removal displayed by each medium, it is expected that a nutrient-binding composition having iron-enhanced activated alumina and biochar would show an additive amount of P removal from the P solution. For example, it is expected that a nutrient-binding composition having iron-enhanced activated alumina (20 g) and biochar (10 g) would remove approximately 0.595 mg/min phosphorus (that is, 0.617 mg/min P removal by the iron-enhanced activated alumina and 0.022 mg/min P addition by the biochar). However, it was surprisingly found that, when subject to the same evaluation as the individual media, a combination of this iron-enhanced activated alumina and biochar produces a synergistic effect and removes more P from the P solution than expected if there was only an additive effect in P-removal. Therefore, one embodiment of a nutrient-binding composition in accordance with the present disclosure includes approximately 66.7% (±3%) iron-enhanced activated alumina and approximately 33.3% (±2%) biochar. In one embodiment, the nutrient-binding composition includes 66.7% iron-enhanced activated alumina and approximately 33.3% biochar. This surprising result is shown in Table 13 below:

TABLE 13

Actual P removal compared with expected P removal by a composition including iron-enhanced activated alumina and biochar.

| Biochar Content | Actual P Removal (mg/min) | Expected P Removal (mg/min) | Observed Effect |
|---|---|---|---|
| 33.3% (10 g) | 0.70 | 0.595 | Synergistic |

EXAMPLE 7

In a seventh non-limiting example, a nutrient-binding composition in accordance with the present disclosure includes a first amount of calcined dolomite as a nutrient-binding ingredient and a second amount of crustacean and/or bivalve shells as a biogenic additive. In one embodiment, the nutrient-binding composition includes approximately 66.7% (±3%) calcined dolomite and approximately 33.3% (±2%) crustacean and/or bivalve shells. In one embodiment, the crustacean and/or bivalve shells is marine limestone.

In one experiment, the calcined dolomite and the limestone (each being generally referred to as "medium" in this Example 7) were each evaluated individually to determine the capability of each to remove P from a volume of moving water, using an experimental setup and evaluation techniques substantially similar to those discussed in Example 1. As is shown in Table 14 below, 30 g of calcined dolomite removed 2.84 mg/min and 30 g of biochar contributed 0.127 mg/min (−0.127 mg/min) P to the P solution:

TABLE 14

Actual P removed by individual media (calcined dolomite and limestone).

| Medium | Actual P Removal (mg/min) |
|---|---|
| Calcined dolomite (30 g) | 2.84 |
| Limestone (30 g) | −0.127 |

Next, a composition was made to evaluate P removal by a combination of calcined dolomite and limestone: 20 g calcined dolomite and 10 g limestone (representing a nutrient-binding composition being 66.7% calcined dolomite and 33.3% limestone).

Based on the actual P removal displayed by each medium, it is expected that a nutrient-binding composition having calcined dolomite and limestone would show an additive amount of P removal from the P solution. For example, it is expected that a nutrient-binding composition having calcined dolomite (20 g) and limestone (10 g) would remove approximately 1.85 mg/min phosphorus (that is, 1.89 mg/min P removal by the iron-enhanced activated alumina and 0.04 mg/min P addition by the limestone). However, it was surprisingly found that, when subject to the same evaluation as the individual media, a combination of this calcined dolomite and limestone produces a synergistic effect and removes more P from the P solution than the calcined dolomite alone. Specifically, a nutrient-binding composition including 20 g calcined dolomite and 10 g limestone actually removed more than two times the P than (approximately 185% more P than, or approximately 285% of) the additive amount expected (1.85 mg/min). Therefore, one embodiment of a nutrient-binding composition in accordance with the present disclosure includes approximately 66.7% (±3%) calcined dolomite and approximately 33.3% (±2%) limestone. In one embodiment, the nutrient-binding composition includes 66.7% calcined dolomite and approximately 33.3% limestone. This surprising result is shown in Table 15 below:

TABLE 15

Actual P removal compared with expected P removal by a composition including calcined dolomite and limestone.

| Limestone Content | Actual P Removal (mg/min) | Expected P Removal (mg/min) | Observed Effect |
|---|---|---|---|
| 33.3% (10 g) | 5.27 | 1.85 | Synergistic |

EXAMPLE 8

In an eighth non-limiting example, a nutrient-binding composition in accordance with the present disclosure includes a first amount of zeolite as a nutrient-binding ingredient and a second amount of botanical materials as a biogenic additive. In one embodiment, the botanical material is pine wood chips. In one embodiment, the nutrient-binding composition includes approximately 66.7% (±3%) zeolite and approximately 33.3% (±2%) pine wood chips.

In one experiment, the zeolite and the pine wood chips (each being generally referred to as "medium" in this Example 8) were each evaluated individually to determine the capability of each to remove N (as ammonium and nitrate) from a volume of moving water, using an experimental setup and evaluation techniques substantially similar to those discussed in Example 1. As is shown in Table 16 below, 30 g of zeolite removed 1.07 mg/min of ammonium and contributed 0.119 mg/min (−0.119 mg/min) of nitrate to the N solution, while 30 g of pine wood chips contributed 0.188 mg/min (−0.127 mg/min) ammonia and no nitrate (0.00 mg/min) to the N solution:

TABLE 16

Actual P and N (as nitrate) removed by individual media (zeolite and pine wood chips).

| Medium | Actual Ammonia Removal (mg/min) | Actual Nitrate Removal (mg/min) |
|---|---|---|
| Zeolite (30 g) | 1.07 | −0.119 |
| Pine wood chips (30 g) | −0.188 | 0 |

Next, a composition was made to evaluate N removal by a combination of zeolite and pine wood chips: 20 g zeolite and 10 g pine wood chips (representing a nutrient-binding composition being 66.7% zeolite and 33.3% pine wood chips).

Based on the actual N (ammonium) removal displayed by each medium, it is expected that a nutrient-binding composition having zeolite and pine wood chips would show an additive amount of ammonium removal from the N solution. For example, it is expected that a nutrient-binding composition having zeolite (20 g) and pine wood chips (10 g) would remove approximately 0.653 mg/min ammonium (that is, 0.713 mg/min ammonium removal by the zeolite and 0.060 mg/min ammonium addition by the pine wood chips). However, it was surprisingly found that, when subject to the same evaluation as the individual media, a combination of this zeolite and pine wood chips produces a synergistic effect and removes more ammonium from the N solution than the zeolite alone. This surprising result is shown in Table 17 below:

TABLE 17

Actual N (as ammonium) removal compared with expected N (as ammonium) removal by a composition including zeolite and pine wood chips.

| Pine Wood Chip Content | Actual Ammonium Removal (mg/min) | Expected Ammonium Removal (mg/min) | Observed Effect |
|---|---|---|---|
| 33.3% (10 g) | 0.96 | 0.653 | Synergistic |

It is also expected that a nutrient-binding composition having zeolite and pine wood chips would show an additive amount of nitrate release into the N solution. For example, it is expected that a nutrient-binding composition having zeolite (20 g) and pine wood chips (10 g) would release approximately 0.04 mg/min ammonium (that is, 0.079 mg/min nitrate release by the zeolite and no nitrate addition by the pine wood chips). However, it was surprisingly found that, when subject to the same evaluation as the individual media, a combination of this zeolite and pine wood chips produces a synergistic effect and actually removes nitrate from the N solution. Therefore, one embodiment of a nutrient-binding composition in accordance with the present disclosure includes approximately 66.7% (±3%) zeolite and approximately 33.3% (±2%) pine wood chips. In one embodiment, the nutrient-binding composition includes 66.7% zeolite and approximately 33.3% pine wood chips. This surprising result is shown in Table 18 below:

TABLE 18

Actual N (as nitrate) removal compared with expected N (as nitrate) removal by a composition including zeolite and pine wood chips.

| Pine Wood Chip Content | Actual Nitrate Removal (mg/min) | Expected Nitrate Removal (mg/min) | Observed Effect |
|---|---|---|---|
| 33.3% (10 g) | 0.11 | −0.079 | Synergistic |

EXAMPLE 9

In a ninth non-limiting example, a nutrient-binding composition in accordance with the present disclosure includes a first amount of calcined dolomite as a P-binding ingredient, zeolite as a N-binding ingredient, and a third amount of botanical materials as a biogenic additive. In one embodiment, the botanical material is pine wood chips. In one embodiment, the nutrient-binding composition includes approximately 66.7% (±3%) calcined dolomite and approximately 30% (±2%) zeolite, and 3.3% (±1%) pine wood chips.

In one experiment, the calcined dolomite, the zeolite, and the pine wood chips (each being generally referred to as "medium" in this Example 9) were each evaluated individually to determine the capability of each to remove both P and N (as ammonium) from a volume of moving water, using an experimental setup and evaluation techniques substantially similar to those discussed in Example 1. As is shown in Table 19 below, 30 g of calcined dolomite removed 2.99 mg/min of P and 0.235 mg/min of ammonium, zeolite contributed 0.0596 mg/min (−0.0596 mg/min) of P and removed 0.889 mg/min of ammonium, while 30 g of pine wood chips contributed 1.10 mg/min (−1.10 mg/min) of P and removed 0.037 mg/min or ammonium to the N and P solution:

TABLE 19

Actual P and N (as ammonia) removed by individual media (calcined dolomite, zeolite, and pine wood chips).

| Medium | Actual P Removal (mg/min) | Actual Ammonia Removal (mg/min) |
|---|---|---|
| Calcined dolomite (30 g) | 2.99 | 0.235 |
| Zeolite (30 g) | −0.0596 | 0.889 |
| Pine wood chips (30 g) | −1.10 | 0.037 |

Next, two compositions were made to evaluate simultaneous N and P removal by (1) a combination of calcined dolomite and zeolite: 15 g calcined dolomite and 15 g zeolite (N and P binders with no biogenic additives) and (2) a combination of calcined dolomite, zeolite and pine wood chips: 20 g calcined dolomite, 9 g zeolite and 1.0 g pine wood chips (N and P binders with a biogenic additive).

Based on the actual P and N (ammonium) removal displayed by each medium, it is expected that a nutrient-binding composition having calcined dolomite, zeolite, and pine wood chips would show an additive amount of P and N (ammonium) removal from the N and P solution. However, it was surprisingly found that, when subject to the same evaluation as the individual media, a combination of calcined dolomite and zeolite produces an antagonistic effect, but that the addition of pine wood chips to the N and P binders produces a synergistic effect and removes substantially more and two times as much P and more than 50% more ammonium that what would be expected if there was only an additive effect. These surprising results is shown in Tables 20 and 21 below:

TABLE 20

Actual P removal compared with expected P removal by a composition including calcined dolomite and zeolite, and a composition including calcined dolomite, zeolite, and pine wood chips.

| Material | Actual P Removal (mg/min) | Expected P Removal (mg/min) | Observed Effect |
|---|---|---|---|
| Calcined dolomite (15 g) and zeolite (15 g) | 0.851 | 1.47 | Antagonistic |
| Calcined dolomite (20 g), zeolite (9 g), and pine wood chips (1.0 g) | 4.36 | 1.76 | Synergistic |

TABLE 21

Actual N (as ammonium) removal compared with expected N (as ammonium) removal by a composition including calcined dolomite and zeolite, and a composition including calcined dolomite, zeolite, and pine wood chips.

| Material | Actual Ammonium Removal (mg/min) | Expected Ammonium Removal (mg/min) | Observed Effect |
|---|---|---|---|
| Calcined dolomite (15 g) and zeolite (15 g) | 0.447 | 0.562 | Antagonistic |
| Calcined dolomite (20 g), zeolite (9 g), and pine wood chips (1.0 g) | 0.689 | 0.430 | Synergistic |

EXAMPLE 10

In a tenth non-limiting example, a nutrient-binding composition in accordance with the present disclosure includes a first amount of aluminum sulfate (in a liquid form, buffered with NaOH to a pH of 7) as a nutrient-binding ingredient and a second amount of crustacean or bivalve shells as a biogenic additive. In one embodiment, the nutrient-binding composition includes approximately 50% (±5%) aluminum sulfate and approximately 50% (±5%) crustacean or bivalve shells, such as oyster shells.

In one experiment, aluminum sulfate and oyster shells (each being generally referred to as "medium" in this Example 10) were each evaluated individually to determine the capability of each to sequester P and prevent it from being released from the sediment-water interface. The experimental setup involved 49 g of homogenized pond sediment with 1.0 g of spirulina powder, and 200 mL of deionized water all contained within a 250 mL HDPE bottles that were tightly capped to allow for anaerobic conditions to develop, placed on an orbital shaker at 50 RPM, and allowed to sit at room temperature for 7 days. Two controls were utilized to determine how much P would be released if no P-binding amendments were added. At the end of the experiment, water samples were obtained, filtered, and the filtrate was analyzed for phosphorus. As is shown below in Table 22, 250 mg of aluminum sulfate prevented the release of 1.09 mg from the anaerobic sediment into the overlaying water. As is also shown below in Table 22, 250 mg of oyster shells not only did not remove any P, but also added 0.192 mg P to the water.

In addition to two controls and the individual material bottle incubations, a composition was made to evaluate P removal by a combination of aluminum sulfate and oyster shells, wherein 50% of the composition is aluminum sulfate and 50% of the composition is oyster shells.

Based on the actual P removal displayed by each medium, it is expected that a nutrient-binding composition having aluminum sulfate and oyster shells would remove less P from the P solution than the aluminum sulfate alone, due to the contribution of P to the water column by the oyster shells. For example, in a nutrient-binding composition including aluminum sulfate and oyster shells, it is expected that the nutrient-binding composition will display P removal that is less than the P removal of the aluminum sulfate, because oyster shells not only do not contribute to P removal, but also add P into the water column. As a specific example, as shown below in Table 22, a nutrient-binding composition being 50% aluminum sulfate and 50% oyster shells would be expected to remove 0.448 mg P.

However, it was surprisingly found that, when subject to the same evaluation as the individual media, a combination of this aluminum sulfate, and oyster shells produces a synergistic effect and removes more P from the water column than the aluminum sulfate alone. Specifically, a nutrient-binding composition including 50% aluminum sulfate and 50% oyster shells actually removed more than double the P than (approximately 163% more P than, or approximately 263% of) the additive amount expected (0.448 mg). Therefore, one embodiment of a nutrient-binding composition in accordance with the present disclosure includes approximately 50% (±5%) aluminum sulfate and approximately 50% (±5%) oyster shells. This surprising result is shown in Table 22 below:

TABLE 22

Actual P removal compared with expected P removal for individual media and one nutrient-binding composition (aluminum sulfate and oyster shells).

| Material | Actual P Removal (mg) | Expected P removal (mg) | Observed Effect |
| --- | --- | --- | --- |
| Aluminum sulfate (250 mg) | 1.09 | N/A | N/A |
| Oyster shells (250 mg) | −0.192 | N/A | N/A |
| Aluminum sulfate (125 mg) and oyster shells (125 mg) | 1.18 | 0.448 | Synergistic |

It will be understood that other nutrient-binding ingredients may be used instead of or in addition to aluminum sulfate. Likewise, it will be understood that the use of other crustacean or bivalve shells instead of or in addition to the oyster shells used in this non-limiting example is contemplated.

EXAMPLE 11

In an eleventh non-limiting example, a nutrient-binding composition in accordance with the present disclosure includes a first amount of zeolite as a nutrient-binding ingredient and a second amount of crustacean or bivalve shells as a biogenic additive. In one embodiment, the nutrient-binding composition includes approximately 66.7% (±3%) zeolite and approximately 33.3% (±2%) crustacean or bivalve shells, such as oyster shells.

In one experiment, zeolite and oyster shells (each being generally referred to as "medium" in this Example 11) were each evaluated individually to determine the capability of each to sequester P and N as ammonium and prevent both nutrients from being released from the sediment-water interface, using an experimental setup and evaluation techniques substantially similar to those discussed in Example 10. As is shown below in Tables 23 and 24, 500 mg of zeolite prevented the release of 0.32 mg N (as ammonium) and facilitated the release of an additional 0.312 mg P from the anaerobic sediment into the overlaying water. As is also shown below in Tables 23 and 24, 250 mg of oyster shells not only did not remove any P or N, but also added 0.192 mg P and 0.42 mg N (as ammonium) to the water.

In addition to two controls and the individual material bottle incubations, a composition was made to evaluate P removal by a combination of zeolite and oyster shells, wherein 66.7% of the composition is zeolite and 33.3% of the composition is oyster shells.

Based on the actual P removal displayed by each medium, it is expected that a nutrient-binding composition having zeolite and oyster shells would add P to the water column, due to the contribution of P to the water column by both individual materials. In one non-limiting example, as shown below in Table 23, a nutrient-binding composition being 66.7% zeolite and 33.3% oyster shells would be expected to add 0.252 mg P. However, it was surprisingly found that, when subject to the same evaluation as the individual media, a combination of zeolite and oyster shells produces a synergistic effect and removes P from the P solution. Specifically, a nutrient-binding composition including 66.7% zeolite and 33.3% oyster shells actually removed 0.288 mg P. This surprising result is shown in Table 23 below:

TABLE 23

Actual P removal compared with expected P removal for individual media and one nutrient-binding composition (zeolite and oyster shells).

| Material | Actual P Removal (mg) | Expected P Removal (mg) | Observed Effect |
| --- | --- | --- | --- |
| Zeolite (500 mg) | −0.312 | N/A | N/A |
| Oyster shells (250 mg) | −0.192 | N/A | N/A |
| Zeolite (250 mg) and oyster shells (125 mg) | 0.288 | −0.252 | Synergistic |

Based on the actual N (as ammonium) removal displayed by each medium, it is expected that a nutrient-binding composition having zeolite and oyster shells would add ammonium to the water column, due to the larger release of ammonium displayed by the oyster shells than the removed of ammonium displayed by the zeolite. In one non-limiting example, as shown below in Table 24, a nutrient-binding composition being 66.7% zeolite and 33.3% oyster shells would be expected to add 0.051 mg N (as ammonium). However, it was surprisingly found that, when subject to the same evaluation as the individual media, a combination of zeolite and oyster shells produces a synergistic effect and removes ammonium from the water column. Specifically, a nutrient-binding composition including 66.7% zeolite and 33.3% oyster shells actually removed 0.225 mg N (as ammonium). This surprising result is shown in Table 24 below:

TABLE 24

Actual N (as ammonium) removal compared with
expected N (as ammonium) removal for individual
media and one nutrient-binding composition.

| Material | Actual Ammonia Removal (mg) | Expected Ammonia Removal (mg) | Observed Effect |
|---|---|---|---|
| Zeolite (500 mg) | 0.32 | N/A | N/A |
| Oyster shells (250 mg) | −0.42 | N/A | N/A |
| Zeolite (250 mg) and oyster shells (125 mg) | 0.225 | −0.051 | Synergistic |

Therefore, one embodiment of a nutrient-binding composition in accordance with the present disclosure includes approximately 66.7% (±3%) zeolite and approximately 33.3% (±2%) oyster shells. It will be understood that other nutrient-binding ingredients may be used instead of or in addition to aluminum sulfate. Likewise, it will be understood that the use of other crustacean or bivalve shells instead of or in addition to the oyster shells used in this non-limiting example is contemplated.

Embodiments

In one embodiment, a nutrient-binding composition comprises: a first amount of a nutrient-binding ingredient; and a second amount of a biogenic additive, the first amount being greater than or equal to the second amount.

In one aspect of the embodiment, the nutrient-binding composition has a greater nutrient removal capacity from a volume of water than an additive nutrient removal capacity of the first amount of nutrient-binding ingredient and the second amount of biogenic added together.

In one aspect of the embodiment, the nutrient-binding ingredient is activated alumina, iron enhanced activated alumina, calcium sulfate, calcium carbonates, calcium silicates including calcium silicate hydrates, calcium oxides, calcium hydroxides, magnesium silicates, magnesium carbonates, magnesium oxides, magnesium hydroxides, metallic iron, iron silicates, iron oxides, iron hydroxides, phyllosilicates, aluminosilicates, expanded clay, expanded shale, zeolites, aluminum-modified zeolite, lanthanum-modified zeolite, cerium-modified zeolite, iron-modified zeolite, and/or activated carbon.

In one aspect of the embodiment, the nutrient-binding ingredient is activated alumina. In one embodiment, the activated alumina consists of particles that are at most 1.5 mm in size.

In one aspect of the embodiment, the biogenic additive is botanical materials, planktonic exoskeleton materials, invertebrate exoskeleton materials, crustacean shells, bivalve shells, modified crustacean shells, modified bivalve shells, insect exoskeleton materials, and/or calciferous products. In one aspect of the embodiment, the biogenic additive is cellulose-based barks, foliage, conifer needles, conifer cones, stalks, mulch, husks, moss, hay, roots, root structures, leaves, flowers, petioles, stems, fronds, herbs, resins, woods, sticks, calcite, aragonite, diatomite, diatomaceous earth, marine limestone, chitin, and/or chitosan.

In one aspect of the embodiment, the nutrient-binding ingredient is activated alumina; and the biogenic additive is diatomaceous earth. In one aspect of the embodiment, the nutrient-binding composition is approximately 95% activated alumina and approximately 4.5% diatomaceous earth.

In one aspect of the embodiment, the nutrient-binding ingredient is activated alumina; and the biogenic additive is a botanical material.

In one aspect of the embodiment, the botanical material includes coconut fiber.

In one aspect of the embodiment, the nutrient-binding composition is approximately 97% activated alumina and approximately 3% botanical material.

In one aspect of the embodiment, the nutrient-binding composition has a nutrient removal capacity that is at least two times greater than an additive nutrient removal capacity of the activated alumina and the botanical material added together.

In one aspect of the embodiment, the nutrient-binding ingredient is activated alumina; and the biogenic additive is bivalve shells. In one aspect of the embodiment, the nutrient-binding composition is approximately 90% activated alumina and between approximately 6% and approximately 14% bivalve shells.

In one aspect of the embodiment, the nutrient-binding composition has a nutrient removal capacity that is at least 20% greater than an additive nutrient removal capacity of the activated alumina and the bivalve shells added together.

In one aspect of the embodiment, the nutrient-binding ingredient is activated alumina; and the biogenic additive includes chitosan. In one aspect of the embodiment, the nutrient-binding composition is approximately 93% activated alumina and approximately 7% chitosan.

In one aspect of the embodiment, the biogenic additive is at least one of modified crustacean shells and modified bivalve shells.

In one aspect of the embodiment, the nutrient-binding composition has a nutrient removal capacity that is at least three times greater than an additive nutrient removal capacity of the activated alumina and the chitosan added together.

It will be understood that other nutrient-binding ingredients may be used instead of or in addition to activated alumina. Likewise, it will be understood that the use of other plant materials instead of or in addition to the coconut fiber used in this non-limiting example is contemplated.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As used herein, "and/or" means "and" or "or". For example, "A and/or B" means "A, B, or both A and B" and "A, B, C, and/or D" means "A, B, C, D, or a combination thereof" and said "A, B, C, D, or a combination thereof" means any subset of A, B, C, and D, for example, a single member subset (e.g., A or B or C or D), a two-member subset (e.g., A and B; A and C; etc.), or a three-member subset (e.g., A, B, and C; or A, B, and D; etc.), or all four members (e.g., A, B, C, and D).

It will be appreciated by persons skilled in the art that the present embodiments are not limited to what has been particularly shown and described herein above. A variety of modifications and variations are possible in light of the above teachings.

What is claimed is:

1. A nutrient-binding composition, comprising:
   a first amount of a nutrient-binding ingredient, the nutrient-binding ingredient including zeolite and calcined dolomite; and
   a synergistically effective second amount of a biogenic additive, the biogenic additive being pine wood chips, the first amount being greater than or equal to the second amount.

2. The nutrient-binding composition of claim 1, wherein:
   the first amount is between approximately 67% and approximately 97% of the total composition of the nutrient-binding composition; and
   the second amount is between approximately 3% and approximately 33% of the total composition of the nutrient-binding composition.

3. The nutrient-binding composition of claim 2, wherein the first amount includes:
   zeolite being approximately 67% of the nutrient-binding composition; and
   calcined dolomite being approximately 30% of the nutrient-binding composition.

4. The nutrient-binding composition of claim 1, wherein:
   the first amount is approximately 97% of the total composition of the nutrient-binding composition; and
   the second amount is approximately 3% of the total composition of the nutrient-binding composition.

* * * * *